Aug 5, 1941.   R. P. KOEHRING ET AL   2,251,410
COMPOSITE METAL STRUCTURE AND METHOD OF MAKING SAME
Filed April 27, 1939

INVENTORS
Roland P. Koehring
Arthur R. Shaw
Spencer Hardman and Felber
their ATTORNEYS Patented Aug. 5, 1941

2,251,410

UNITED STATES PATENT OFFICE 2,251,410

COMPOSITE METAL STRUCTURE AND METHOD OF MAKING SAME

Roland P. Koehring and Arthur R. Shaw, Dayton, Ohio, assignors to General Motors Corporation, Detroit, Mich., a corporation of Delaware Application April 27, 1939, Serial No. 270,291

10 Claims. (Cl. 29—189)

This invention relates to articles made from sintered metal powders, and more particularly to laminated articles including a plurality of layers having varying physical properties.

An object of the invention is to provide a method of making laminated articles from sintered metal powder, wherein the sintered metal powder is bonded to a more dense metal back or support.

In carrying out the above objects it is a further object to provide a method whereby a sintered porous metal layer may be completely and more strongly bonded to a more dense metal back than is possible by present methods.

It is a further object of the invention to provide a highly porous sintered layer strongly bonded to a dense metal back as a means for locking a less porous powdered metal layer to the metal back prior to the sintering thereof, said less porous metal layer being bonded to the highly porous metal layer after the heating step has been completed.

Further objects and advantages of the present invention will be apparent from the following description, reference being had to the accompanying drawing wherein a preferred embodiment of the present invention is clearly shown.

In the drawing:

Fig. 1 shows a cross sectional view of a steel strip or the like.

Figure 4:
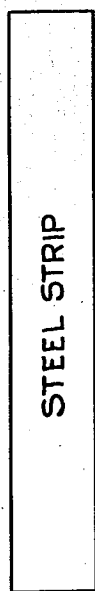
Fig. 4 is a flow chart setting forth the various steps in the process of manufacture.
Figure 4:
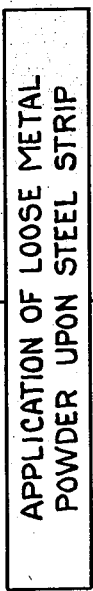
Figure 4:
Figure 4:
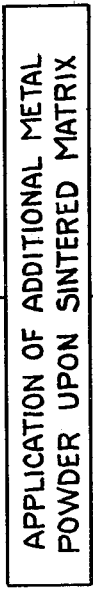
Figure 4:
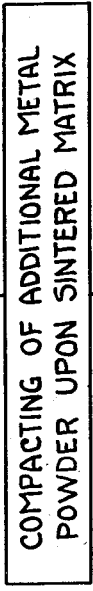
Figure 4:
Figure 1:
Figure 2:
Fig. 2 shows a strip in Fig. 1 wherein a thin layer of highly porous metal has been bonded thereto.
Figure 3:
Fig. 3 shows the strip depicted in Fig. 2 wherein a more dense porous layer has been superimposed upon the highly porous metal layer.

The present invention is directed to a method whereby briquetted powdered metals may be bonded to a dense metal supporting back inexpensively and efficiently without the use of pressure during the sintering operation. In the past, when a briquetted layer of metal powder has been superimposed upon a dense metal supporting back of substantial area, it has been found that during the heating step which is necessary to cause bonding between the powdered metal layer and the dense metal, that a warping occurs whereby the powdered metal layer is not in complete contact with the more dense metal supporting back at certain portions thereof. As a result the bond between the metal powder layer and the back is imperfect. This same warping occurs when large areas of metal powder are briquetted directly upon the supporting back. Heretofore it has been found necessary to lead coat the supporting back so that the briquetted metal is mechanically forced into the soft metal and thereby is held in place. This expedient is expensive and not entirely satisfactory when working on large surfaces. Another means of obtaining good contact during sintering is to cause the metal powders to be pressed against the supporting back during the heating period. Here again the expense of the process is increased and various mechanical problems arise which are difficult to overcome.

It has been proposed in the Koehring application, Serial No. 85,297, Patent No. 2,198,253 that powdered metal can be spread in a loose non-compacted layer on a metal strip or sheet which strip or sheet may next be heated to cause the loose layer of metal powders to sinter together and simultaneously bond to the backing. In this method it is apparent that since the powdered metal is in a non-compacted condition that there is no rigidity to the layer, and therefore upon warpage of the supporting back during heating, the metal powder conforms quite readily to this slight change in shape of the back and sinters together as well as bonds to the back.

It has been discovered that supporting backs of steel, nickel, copper, copper plated steel, iron and in fact practically any commercial metal may be used with success, and that the loose metal powders may include single metal powders such as copper, nickel, iron, aluminum, etc. Alloy powders may also be used, such as bronze powders or mixtures of metal powders as copper and tin powders, copper and nickel powders, iron and copper powders, etc., may all be used under varying conditions to provide the desired type of porous metal layer. It is apparent that the layer formed from a loose non-compacted distribution of metal powder will be highly porous in nature, and in some cases these pores will extend entirely through the metal layer to the backing. Control of the porosity of the layer may be accomplished by the use of various grain size metal powders, the larger the grain size the greater the porosity, or the sintered layer can be compacted by pressure rolls if desired. Particular composition of metal powders to be used in highly porous layers, form no part in the present invention as many of such combinations can be found disclosed in the aforementioned Koehring application.

Our invention proposes the briquetting of a second metal powder layer 22 directly upon a highly porous metal sintered layer 24 which is bonded to a strong back 26, whereby the briquetted layer is mechanically held to the supporting back by roots thereof extending into the pores of the highly porous layer forced in by compressing the metal. Thus, during a second sintering operation of the briquetted metal layer, said layer is mechanically held in close association with the rough surface of the sintered metal layer, and due to the roots thereof which extend into the pores of the sintered metal layer, the briquetted metal layer is held firmly in place even though warpage occurs. Briquetting pressures of from 10,000 to 80,000 pounds per square inch have been found satisfactory to lock the briquetted material to the backing. The briquetted material may consist of any of the aforementioned metal powders, and the second sintering of the assembly is carried out at temperatures similar to those used in highly porous metal layers in place. For example, if mixtures of metals are used it is desirable to heat the material to a temperature intermediate the melting point of the component metals for a period of from 10 minutes to one half hour under suitable non-oxidizing conditions. However, if a single metal powder is used, it is preferable to heat the assembly to a sintering temperature below but approximating the melting point of the metal powder. It is to be understood that the specific metal powders used, sintering times and temperatures, and briquetting pressures, which are all well known to the art, do not form the basis of the present invention, which contemplates the use of a highly porous intermediate metal layer as a means for mechanically and metallurgically associating a more dense porous metal layer to a substantially non-porous supporting back.

In order to illustrate one application of the invention, the following example is given. A steel strip is provided which may be copper plated as a supporting member. It has been found that if the steel is perfectly clean on the surface thereof that the plating may be dispensed with. A relatively thin layer of loose non-compacted metal powder is next distributed upon the surface of the steel. For illustration purposes this loose powder layer may be a mixture of iron and copper powders wherein the percentage of iron is greater than 50% of the mixture. The steel plate with the iron copper layer thereon is next sintered under non-oxidizing conditions, and at a temperature ranging from 2000 to 2050° F. for a period of from 10 to 20 minutes, whereupon it is cooled under non-oxidizing conditions to prevent any oxidation of the sintered layer. After this operation, the iron copper layer is highly porous and is firmly bonded to the surface of the steel strip. This may be explained by the fact that the copper wets the surface of the iron and alloys therewith to some extent and simultaneously wets the surface of the steel. Thus, the iron copper is attached to the steel by an alloy bond.

The steel strip with the highly porous matrix of iron copper bonded thereto is next preferably placed in a die and powdered metal is distributed upon the matrix layer. For illustrative purposes this powder may be a mixture of 90% copper and 10% tin. The powdered metal is next compacted or briquetted under pressures ranging upwardly from 10,000 pounds per square inch and preferably 20,000 pounds per square inch. It is apparent that the specific pressure is of little importance, since the lower the pressure the greater the porosity, and vice versa. This compacting or briquetting forces the powdered metal into the pores of the iron copper matrix, and consolidates the powdered metal layer into a self sustaining mass. Thus the compacted layer of powdered metal is mechanically locked to the steel strip by means of the intermediate highly porous sintered metal layer. A sufficient amount of copper and tin powder is used to form a briquetted layer of the desired thickness, and this quantity must be predetermined.

The steel strip with the briquetted copper and tin powder thereon is now sintered for the second time, and due to the composition of the briquetted layer a sintering temperature of from 1500 to 1550° F. is preferably used for a period of from 10 to 20 minutes. During this sintering operation the copper and tin alloy together to form a bronze, and also alloy with the matrix metal so that the sintered briquetted layer is bonded to the matrix metal, and in some cases where the pores extend entirely through the matrix layer, a bond is effected directly through to the steel strip. This briquetted layer of sintered bronze material is porous to some extent but of considerably less porosity than the matrix layer which is formed from non-compacted powders. It is to be understood that the briquetted powdered layer may include die lubricants, such as, zinc stearate, stearic acid, lubricating oils or any of the well known die lubricants as well as void forming compounds, if desired, such as the fatty acid or salt thereof, above referred to, or ammonium chloride, salicyclic acid, etc.

This invention is particularly applicable in the manufacture of commercial and automotive clutch plates, wherein large flat areas of porous metal must be bonded to a strong supporting material. In this instance it may be desirable to add some material having the desired frictional characteristics to the powdered metal used in the briquetted layer, some of such materials being carbon materials such as graphite, lead, asbestos, alundum or silica, etc. In this case the material is mixed with the powdered metal prior to the briquetting thereof, and is uniformly dispersed throughout the metal layer.

While the embodiment of the present invention as herein disclosed, constitutes a preferred form, it is to be understood that other forms might be adopted, all coming within the scope of the claims which follow.

What is claimed is as follows:

1. A method of making composite stock, comprising the steps of; applying a layer of loose non-compacted metal powder upon a reinforcing member of a dense metal; sintering the member with the powdered metal thereon under suitable conditions for causing the powdered metal to sinter together and form a strong porous metal layer and simultaneously bond to the dense metal member; and then compacting a layer of metal powder upon the porous metal layer; and then sintering the assembly for integrating the layers, whereby the compacted powdered metal layer is sintered together and is firmly attached to the dense metal member by means of the highly porous intermediate layer.

2. The steps in the method of making composite stock, comprising the steps of; spreading a loose layer of non-compacted metal powder upon the supporting surface; sintering the layer under suitable conditions for causing the powdered metal to sinter together and form a highly porous metal layer; compacting a layer of metal powder upon said highly porous metal layer, whereby the metal powder is pressed into the pores of the highly porous metal layer; and then sintering the assembly for causing the compacted powdered metal to sinter together and simultaneously bond to the porous metal layer.

3. A method of making composite laminated stock, comprising the steps of; providing a sheet of steel or the like; applying a uniform layer of a metal powder which will readily bond to the sheet in loose non-compacted form upon the sheet; heating the sheet with the metal powder thereon under suitable conditions to cause the metal powder to bond to the sheet and simultaneously sinter together and form a highly porous matrix; briquetting a second layer of metal powder upon said matrix; and then sintering the laminated structure for causing the second powdered metal layer to bond together and form a relatively less porous layer than the first mentioned layer and simultaneously cause the second mentioned layer to bond to the first mentioned layer.

4. A method of making composite stock, comprising the steps of; applying a loose non-compacted layer of metal powder upon a reinforcing member of steel or the like, said metal powder including at least one component which will readily bond to the surface of the steel; sintering the member with the powdered metal thereon under nonoxidizing conditions for a time sufficient to cause the powdered metal to sinter together and form a strong highly porous layer and simultaneously bond to the steel member; compacting a layer of metal powder upon said porous metal layer whereby the compacted material is mechanically held in contact with the porous metal layer; and then sintering the assembly for metallurgically integrating the highly porous layer and the second mentioned layer, whereby the second mentioned layer is sintered together and is firmly attached to the steel member by means of an alloy bond through said highly porous intermediate layer.

5. In a method of bonding together two layers of metal which do not readily bond to one another at temperatures below the melting point of the metal in either layer, the steps comprising; sintering an intermediate layer of noncompacted metal powder to one of the metal layers which has a bonding affinity for the metal of both layers at temperatures below the melting points of said metals, superimposing a second layer of metal powder on the intermediate layer by briquetting metal powder thereon, and then heating the assembled layers whereby the layers are each bonded to the sintered metal layer.

6. A composite laminated structure, comprising; a sheet of steel or the like, a highly porous layer of sintered non-compacted metal powder bonded to said sheet, and a second layer of relatively less porous metal superimposed upon and bonded to said highly porous layer.

7. A composite laminated structure, comprising; a sheet of steel or the like, a highly porous layer of sintered non-compacted metal powder bonded to said sheet, and a second layer of relatively less porous metal superimposed upon and bonded to said highly porous layer, said second layer comprising a high percentage of a bronze.

8. A composite laminated structure, comprising; two layers of metal, and an intermediate layer of relatively higher porosity metal than either of said two layers and metallurgically bonded to each of said two layers said intermediate layer being formed from sintered non-compacted metal powder.

9. A composite laminated structure comprising two layers of porous metal, one of said layers being formed from non-compacted metal powder and the other said layer being formed from compacted metal powders, the compacted layer having roots thereof extending into the pores of the non-compacted layer, said layers being held together by a metallurgical bond therebetween.

10. The method of making a composite structure, the step of bonding a highly compacted powdered metal layer to a more dense metal supporting material through the medium of an intermediate highly porous metal layer made from sintered non-compacted metal powder bonded to said dense metal whereby the highly compacted layer is sintered and simultaneously bonded to the intermediate layer.

ROLAND P. KOEHRING.
ARTHUR R. SHAW.